United States Patent
Rytwo

(10) Patent No.: US 11,192,808 B2
(45) Date of Patent: Dec. 7, 2021

(54) METHOD FOR PRODUCTION OF POTABLE WATER

(71) Applicant: Gavish-Galilee Bio Applications, Ltd., Kiryat Shmona (IL)

(72) Inventor: Giora Rytwo, Kibbutz Sde Nehemia (IL)

(73) Assignee: GAVISH-GALILEE BIO APPLICATIONS LTD., Kiryat Shmona (IL)

(*) Notice: Subject to any disclaimer, the term of this patent is extended or adjusted under 35 U.S.C. 154(b) by 0 days.

(21) Appl. No.: 16/085,085

(22) PCT Filed: Jun. 29, 2016

(86) PCT No.: PCT/IL2016/050700
§ 371 (c)(1),
(2) Date: Sep. 14, 2018

(87) PCT Pub. No.: WO2017/158581
PCT Pub. Date: Sep. 21, 2017

(65) Prior Publication Data
US 2019/0152813 A1    May 23, 2019

Related U.S. Application Data

(60) Provisional application No. 62/309,660, filed on Mar. 17, 2016.

(51) Int. Cl.
| | | |
|---|---|---|
| C02F 1/56 | (2006.01) | |
| C02F 1/52 | (2006.01) | |
| C02F 9/00 | (2006.01) | |
| B01D 21/01 | (2006.01) | |
| C02F 1/28 | (2006.01) | |
| C02F 1/44 | (2006.01) | |
| C02F 1/76 | (2006.01) | |
| C02F 103/06 | (2006.01) | |
| C02F 103/00 | (2006.01) | |
| C02F 103/08 | (2006.01) | |
| C02F 1/00 | (2006.01) | |

(52) U.S. Cl.
CPC .............. *C02F 1/56* (2013.01); *B01D 21/01* (2013.01); *C02F 1/5236* (2013.01); *C02F 1/5263* (2013.01); *C02F 1/5272* (2013.01); *C02F 9/00* (2013.01); *C02F 1/001* (2013.01); *C02F 1/004* (2013.01); *C02F 1/283* (2013.01); *C02F 1/441* (2013.01); *C02F 1/76* (2013.01); *C02F 2103/007* (2013.01); *C02F 2103/06* (2013.01); *C02F 2103/08* (2013.01); *C02F 2209/11* (2013.01); *C02F 2303/04* (2013.01); *C02F 2305/08* (2013.01)

(58) Field of Classification Search
CPC .. C02F 1/56; C02F 9/00; C02F 1/5272; C02F 1/5263; C02F 1/5236; C02F 1/001; C02F 2103/06; C02F 1/004; C02F 2305/08; C02F 2303/04; C02F 2209/11; C02F 2103/08; C02F 2103/007; C02F 1/76; C02F 1/441; C02F 1/283; B01D 21/01
See application file for complete search history.

(56) References Cited

U.S. PATENT DOCUMENTS

| | | | | |
|---|---|---|---|---|
| 2,368,055 A | * | 1/1945 | Walker | C02F 3/1215 210/626 |
| 2,553,900 A | * | 5/1951 | Doan | G01V 9/02 166/252.6 |
| 3,066,095 A | * | 11/1962 | Hronas | C02F 1/5236 210/728 |
| 4,392,959 A | * | 7/1983 | Coillet | B01D 61/022 210/638 |
| 5,128,029 A | * | 7/1992 | Herrmann | B01D 29/05 210/107 |
| 5,543,056 A | | 8/1996 | Murcott et al. | |
| 9,546,102 B2 | | 1/2017 | Rytwo | |
| 2006/0039841 A1 | * | 2/2006 | Rico | A61L 2/208 422/305 |
| 2013/0336877 A1 | | 12/2013 | Soane et al. | |
| 2014/0042100 A1 | | 2/2014 | Rytwo | |
| 2016/0207083 A1 | | 7/2016 | Kim et al. | |

FOREIGN PATENT DOCUMENTS

CN    1789312 A  *  6/2006

OTHER PUBLICATIONS

Liang, X et al. 2014. Flow cytometry is a promising and rapid method for differentiating between freely suspended *Escherichia coli* and *E. coli* attached to clay particles. Journal of Applied Microbiology 117, 1730-1739 (Year: 2014).*
DU (CN-1789312) machine translation and original attached (Year: 2006).*
Unuabonah et al. 2014. Clay-polymer nanocomposites (CPNs): Adsorbents of the future for water treatment. Applied Clay Science 99:83-92. (Year: 2014).*
Rytwo, "Hybrid Clay-Polymer Nanocomposites for the Clarification of Water and Effluents" Recent Patents on Nanotechnology, pp. 1-13, vol. 11 (Jan. 2017).
Rytwo, G , et al.; "A pilot plant for the treatment of cowshed effluents". Water Irrig., pp. 6-9, vol. 530 (Sep. 2013).
Adin, A.,et al; "Pretreatment of seawater by flocculation and settling for particulates removal". Elsevier Science Publishers B.V., pp. 227-242, vol. 58 (1986).
Hannouche, A. et al."Relationship between turbidity and total suspended solids concentration within a combined sewer system". Water Sci. Technol., pp. 2445-2452, vol. 64 (2011).

(Continued)

*Primary Examiner* — Liam Royce
(74) *Attorney, Agent, or Firm* — The Roy Gross Law Firm, LLC; Roy Gross

(57) ABSTRACT

The present invention relates to a method for production of potable water by removal from water of an aqueous environment selected from a river, a lake, a reservoir, a pond, a stream, groundwater, spring water, surface water, or combinations thereof, organic colloidal particles of biocontaminants. The method comprises applying to the water at least one nanocomposite consisting of a mineral platform, which is denser than water, and at least one polyelectrolyte polymer adsorbed to said mineral platform with charge opposite to the charge of the colloidal particles.

3 Claims, 5 Drawing Sheets

(56) References Cited

OTHER PUBLICATIONS

Litaor, M.I.et al."Treatment of winery wastewater with aerated cells mobile system". Environmental Nanotechnology, Monitoring & Management, pp. 17-26, vol. 4 (Mar. 2015).
Rytwo, "The Use of Clay-Polymer Nanocomposites in Wastewater Pretreatment" Sci. World J., vol. 2012, Artcle ID 498503, 7 pages (2012).
Rytwo, G et al.; "Direct Relationship Between Electrokinetic Surface-charge Measurement of Effluents and Coagulant Type and Dose". Colloids Interface Sci. Commun., pp. 27-30, vol. 1 (Jun. 2014).
Rytwo, G., et al.;"Clarification of olive mill and winery wastewater by means of clay-polymer nanocomposites". Sci. Total Environ., pp. 134-142, vol. 442 (Jan. 2013).
Walton "Electrical Conductivity and Total Dissolved Solids—What is Their Precise Relationship?" Desalination 72, pp. 275-292, (1989).

* cited by examiner

METHOD FOR PRODUCTION OF POTABLE WATER

FIELD OF THE INVENTION

The present invention relates to a method for production of potable water from an aqueous environment.

BACKGROUND OF THE INVENTION

The need for water is exponentially increasing in the last decades due to the increase in world population and excessive use. It becomes clear that fresh water resources will not be able to meet all requirements for the rapidly growing world population, particularly in dry areas. The need for increased amounts of water implies adopting several approaches to supply water from natural water sources such as rivers, lakes, reservoirs, ponds, streams, ground water, spring water and the like. These approaches include: (a) intercepting, diverting, storing and transferring water, (b) desalination of sea water, and (c) water re-use. In all the approaches, removal of turbidity and total suspended solids (TSS) is a crucial step, as one of the essential parameters limiting water quality.

In the process of interception, diverting, transferring and storing, the water might contain silt and particulate material from soil erosion or construction runoff, algae developing fast on nutrients from agricultural of industrial runoff or bacteria and other pathogens coming from domestic sewage, livestock and even natural sources. All those contribute to turbidity and Total Suspended Solids (TSS) that must be removed. Chlorination is widely used for this purpose; however, possible formation of harmful byproducts when soluble organic compounds are present is considered a severe handicap to the use of chlorination.

In desalination feed water, even though it would be expected from the double layer theory that the high salt content will cause fast coagulation, natural colloidal do not tend to coagulate but remain in dispersion. Thus efficient suspended solids and turbidity removal (to values <0.5 NTU) imply pretreatments that include in most cases steps of coagulation and flocculation.

In natural water, most suspended solids are made up of inorganic materials, though bacteria and algae can also contribute to the total solids concentration, and their detrimental effects are reduction of water quality for drinking and recreation and degrading aquatic habitats, whereas in desalination plants TSS has to be removed to avoid clogging of the reverse osmosis membranes.

The use of water from the aforementioned aqueous sources without reducing turbidity and TSS may result in clogging water filtering devices and membranes during the water purification process. Indeed, colloidal particles that tend to clog filtering devices and membranes are one of the problems with such aqueous sources. In most cases, colloidal stability, i.e. the colloids' tendency to remain dispersed in water, is due to the fact that the particles are very small and negatively charged. Due to similar charges of these particles, the mutual electrostatic repulsion forces keep them suspended in water. In several cases, pre-treatment processes of water taken from the aqueous sources, involve the use of chemicals for neutralisation, flocculation, and precipitation of those colloids. In most cases, such treatments are based on two separate steps.

The first step in this process is technically known as "coagulation", which is defined as neutralisation of the colloids' charge, thereby reducing the electrostatic repulsion between the colloidal particles and consequently enabling their aggregation. The second step is known as "flocculation", which is agglomeration of several relatively small particles to form larger aggregates that, due to their increased size and density, now can precipitate at the bottom of the vessel, leaving significantly clarified water. Such destabilisation of the colloidal suspension, inducing flocculation of large amount of suspended matter, lowers values of TSS, turbidity, and the chemical oxygen demand (COD). The combination of coagulation and flocculation processes may increase the size of the colloidal particle from 0.2 to 50 µm. Separation of the large aggregates is performed by sedimentation, decantation or filtration.

In addition to relatively non-hazardous colloidal compounds as humic materials or minerals, potable water is not safe for drinking until biological pollutants such as bacteria, microbes and viruses are removed. Some common filtration systems including activated carbon, ion exchange resins, and synthetic fabrics may be used to effectively remove organic compounds and certain metal cations. However, since most of those adsorbents possess neutral or negatively charged surfaces, they cannot specifically adsorb negatively charged microorganism.

Clays and organoclays (clay minerals treated with organocations) have been widely used for the pretreatment of effluents. Combination of clay minerals and organic compounds efficiently removed colloidal solids in paper mill wastewater. Several studies used cationic or anionic polyelectrolytes, combinations of coagulants and polyelectrolytes, or even combination of clay minerals and organic quaternary ammonium ions for the removal of organic contaminants from olive mill wastewater. In all cases, considerable changes in the colloidal properties of the effluent, including reduction in turbidity, TSS, COD and other quality parameters was achieved.

Nanocomposite materials consisting of polymer molecules and natural or layered minerals like clays have been shown by the present inventor to reduce TSS and turbidity of wastewater by 95% in winery, cowshed, olive mill and in other industrial effluents (WO 2012/176190; WO 2015/022695; Litaor et al., 2015; Rytwo and Malka, 2013; Rytwo et al., 2013).

There still remains an unmet need for improving potability and purity of water taken from aqueous sources, such as rivers, lakes, reservoirs, ponds, streams, ground water, spring water and feed water from desalination plants, especially in flow-through devices, where costly filtering devices and membranes are used. Suitable methods for the efficient removal of suspended colloidal particles together with microorganisms in a fast, safe and cost-effective flow-through process are required.

SUMMARY OF INVENTION

It has now been found, in accordance with the present invention, that clarification of water from an aqueous environment for use as potable water can be achieved by application of a nanocomposite consisting of a mineral platform in which is adsorbed at least one polyelectrolyte.

The method of the invention for production of potable water may be applied to any suitable natural aqueous source or environment including, but not limited to, a river, a lake, a reservoir, a pond, a stream, ground water, spring water, surface water and plant desalination feed water, or combinations thereof. These aqueous environments contain suspended charged mineral and organic colloidal particles. The organic colloidal particles may be of biocontaminants including viruses, bacteria, algae, fungi, yeast, mold, parasites, prions and combinations thereof.

The clarification of the water is obtained by application to the water of the aqueous environment or to water collected from the aqueous environment at least one nanocomposite consisting of: (a) a mineral platform which is denser than water and most organic compounds and (b) at least one polyelectrolyte polymer adsorbed to said mineral platform.

The polyelectrolyte polymer has a charge that opposes the charge of the suspended colloidal particles thus neutralizing the charged colloidal particles, followed by bridging between the neutralized colloidal particles with fast formation of neutralized flocs that anchor around the nanocomposites. The fast treatment is achieved within a broad range of conditions, in one single tank and without any need for pH adjustment. The rational beyond the invention is based on the following assumptions: considering that the difference in density between the formed flocs and the water might be very small (at least in organic colloids, algae, bacteria, etc.), even if large aggregates are formed, the limiting factor for sedimentation time will be the density difference. Accordingly, increasing the density of the aggregates might considerably shorten sedimentation time. This might be achieved by preparing a nanocomposite based on a denser clay mineral (2.6-fold larger density than water and most organic compounds) and a neutralizing charged polymer. As an illustration, indeed the combination of a mineral clay nanoparticle as sepiolite bound to cationic polymers with relatively long branches, form a nanoparticle with a denser core and large cationic branches. The cationic charges on the polymer branches bind to negatively-charged colloids, forming large and neutralized aggregates that connect to neutral colloids by Van-der-Vaals interactions, whereas the clay mineral "nuclei" increase the overall density, speeding up sedimentation. The combination of all three mechanisms (neutralization, aggregation and increased density) was termed "coagoflocculation".

In this way, after sedimentation, the method of the invention achieves in one single application in a time range of about 15 minutes or less a reduction of the total suspended solids (TSS) to 15 mg/l or less and of turbidity to 10 NTU (Nephelometric Turbidity Units) or less, and consequent clarification of the water.

BRIEF DESCRIPTION OF THE FIGURES

The present invention will be understood and appreciated more fully from the following detailed description taken in conjunction with the appended figures.

DETAILED DESCRIPTION OF THE INVENTION

Figure 1:
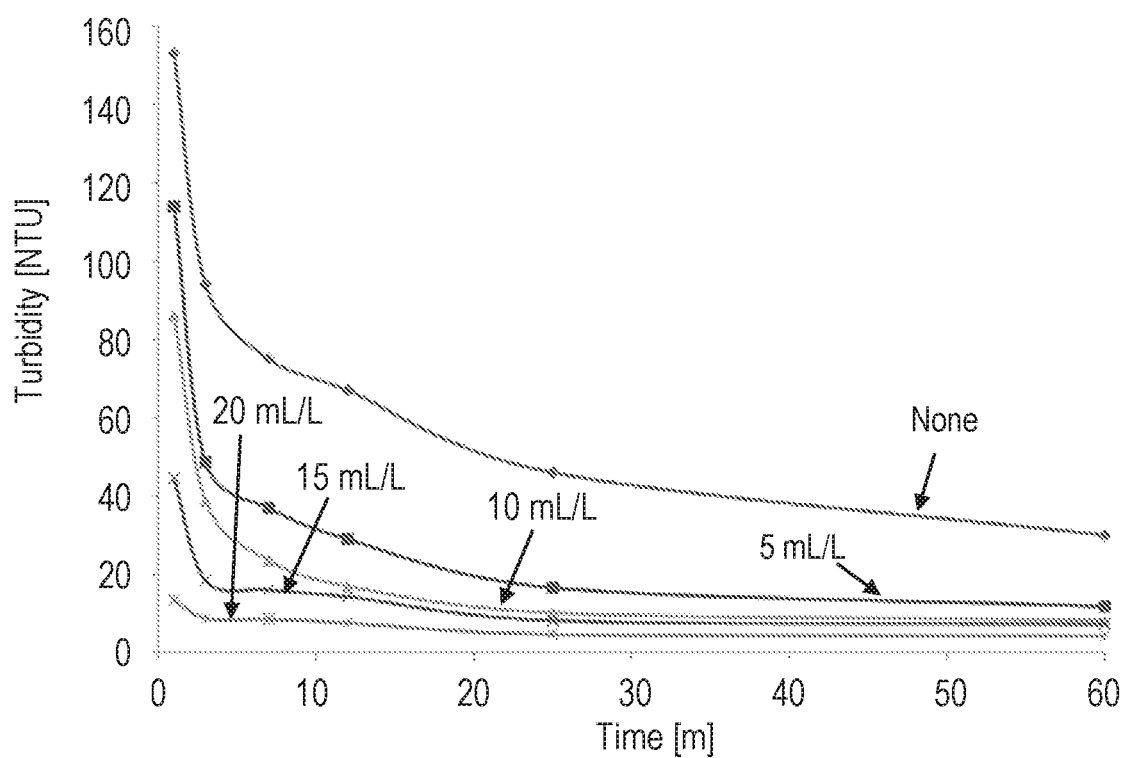
FIG. 1 shows turbidity as a function of time at several doses of a 1% NZ suspension as described in Example 2.

The present invention relates to a method for production of potable water by clarification of water of an aqueous environment selected from a river, a lake, a reservoir, a pond, a stream, groundwater, spring water, desalination plant feed water, surface water, or combinations thereof, the aqueous environment including suspended charged mineral, organic colloidal particles that may be biocontaminants, and mixtures thereof, the method comprising: applying to the water of said aqueous environment at least one nanocomposite consisting of: (a) a mineral platform which is denser than water and most organic compounds and (b) at least one polyelectrolyte polymer adsorbed to said mineral platform, the polyelectrolyte polymer having charge that opposes the charge of the suspended colloidal particles; whereby neutralization of the charged colloidal particles and bridging between the neutralized colloidal particles occur with fast formation of neutralized flocs that anchor around the nanocomposites, thus achieving in one single application in a time range of about 15 minutes or less a reduction of the total suspended solids (TSS) to 15 mg/l or less and of turbidity to 10 NTU (Nephelometric Turbidity Units) or less, and consequent clarification of the water.

Abbreviations used in the present application: AM-co-DMAEA, acrylamide-dimethylaminoethyl methacrylate methyl chloride copolymer (polyquaternium-15); NC, poly-DADMAC-sepiolite nanocomposite; NC10, nanocomposite suspension based on 60 mg poly-DADMAC per g sepiolite; NC18, nanocomposite suspension based on 400 mg poly-DADMAC per g sepiolite; NC22, nanocomposite suspension based on 1000 mg poly-DADMAC per g sepiolite; NH, chitosan-sepiolite nanocomposite; NH10, nanocomposite suspension based on 60 mg chitosan per g sepiolite; NH18, nanocomposite suspension based on 400 mg chitosan per g sepiolite; NH22, nanocomposite suspension based on 1000 mg chitosan per g sepiolite; NV, poly-DADMAC-bentonite nanocomposite; NZ, AM-co-DMAEA-sepiolite nanocomposite; PAM, poly(acrylamide-co-acrylic acid) copolymer; PD or poly-DADMAC, poly(diallyldimethylammonium) chloride; PD-S9, same as NC; PMVE, poly(methylvinyl ether-alt-maleic anhydride) copolymer; S9, sepiolite; TSS, total suspended solids The term "potable water" as used herein refers to water of a quality suitable for human consumption including drinking water, water for industries such as pharmaceutical industry and food industry. The term "food industry" as used herein includes water for irrigation of preliminary crop production and water for watering of livestock.

The term "water of the aqueous environment" refers herein to the treatment of the aqueous environment itself or to water collected from the aqueous environment and then treated.

The term "clarification of water" refers to the final part of the general process of producing potable water in a plant and allows the large flocs containing much of the suspended matter to sink to the bottom of a tank or basin, while the clear water overflows and is then further treated. Clarification removes mineral and organic suspended solids from raw water and also removes the portion of dissolved organic matter that can be coagulated.

The term "total suspended solids (TSS)" refers to the dry-weight of particles trapped by a filter, and is a water quality parameter used to assess the quality of water.

The term "turbidity" refers to the cloudiness of a fluid caused by large numbers of suspended individual particles of many different sizes that are generally invisible to the naked eye. Some suspended material may be large enough and heavy enough to settle rapidly to the bottom of the container if a liquid sample is left to stand, while very small particles will settle only very slowly or not at all if the sample is regularly agitated or the particles are colloidal. These small solid particles cause the liquid to appear turbid. The measurement of turbidity is a key test of water quality.

The term "quality of water standards" refers to standards set by governments for drinking water and for ambient waters and differ from country to country and even in different geographical regions of the same country. The U.S. Environmental Protection Agency (EPA) and the World Health Organization have set standards on the allowable turbidity in drinking water of no more than 5 NTU, while the European standards do not appear to address turbidity and in India the permissible limit is 10 NTU.

The nanocomposites for use in the method of present invention are composed of a mineral platform and one or more polyelectrolyte polymers adsorbed on said mineral platform. The mineral platform serve as anchoring particles and should have the following properties: (i) a size/diameter of less than 0.5 µm in at least one dimension, resulting in a large specific surface area; (ii) the ability to adsorb cationic or anionic polymers in strong interactions; (iii) the mineral platform should be denser than the water and most organic compounds dissolved or suspended in the water, namely, the bulk density of the mineral particles should be larger than the density of the water being treated.

In certain embodiments, the mineral platform is based on a clay mineral selected from sepiolite, palygorskite, attapulgite, smectite, montmorillonite, vermiculite, bentonite, hectorite, kaolinite, halloysite, vermiculite, laponite, or saponite. In certain other embodiments, the mineral platform is a non-clay mineral including quartz, diatomaceous earth, and zeolites. In certain further embodiments, the mineral platform is a mixture of a clay mineral and a non-clay mineral as defined hereinbefore.

In certain embodiments, the clay mineral is sepiolite, a needle-like clay mineral that is a powerful sorbent. In certain other embodiments, the mineral platform is bentonite. In certain further embodiments, the mineral platform is halloysite.

The biocontaminants that may be present in the aqueous environment to be treated include virus, bacteria, fungi, yeast, mold, parasites, algae, prions, and combinations thereof. Most of the bacteria carry a negatively-charged surface. Viruses have a negative charge in the nucleic acid material, but they are coated with proteins that may be neutral, positive or negative and, consequently, some viruses are negatively-charged and others are positively-charged. Many algae, particularly microalgae cells, are negatively-charged.

In certain embodiments, the aqueous environment includes negatively-charged colloidal particles suspended therein and the nanocomposite consists of a mineral platform and a polyelectrolyte polymer with positive charges, namely, a polycationic polymer, to neutralize the negative charge of the colloidal particles. In addition, the polycationic polymer should preferably have medium to long chains with the charges dispersed along/throughout such as to allow the bridging of the neutralized colloidal particles between them while anchoring to the mineral platform particles. The polycationic polymer should also be relatively water-soluble in water to allow its efficient distribution in the aqueous environment water to be treated.

In certain embodiments, the polycationic polymer is selected from: (i) a linear water-soluble polymer including poly(diallyldimethylammonium) chloride (herein PD, poly-DADMAC or PDADMAC), a cationic polyacrylamide or a polyethyleneimine; (ii) a polyquaternium polymer having quaternary ammonium functional groups in the center of the polymer molecule including Polyquaternium 10 (quaternized hydroxyethylcellulose ethoxylate), Polyquaternium 11 (copolymer of vinylpyrrolidone and quaternized dimethylaminoethyl methacrylate also designated Poly(1-vinylpyrrolidone-co-2-dimethylaminoethyl methacrylate); Polyquaternium 15 (acrylamide-dimethylaminoethyl methacrylate methyl chloride copolymer, abbreviated as AM-co-DMAEA) (iii) cationic biopolymers such as cationic guar gum and chitosan; (iv) polymers containing aromatic rings such as quaternized poly-4-vinylpyridine-co-styrene and other styrene-based cationic copolymers; and (v) combinations thereof.

In certain embodiments, the nanocomposite applied to the aqueous environment water including negatively-charged colloidal particles consists of a mineral platform based on sepiolite, bentonite or halloysite and the polycationic polymer is selected from poly-DADMAC, chitosan or Polyquaternium 15 (AM-co-DMAEA). Examples of said nanocomposites include poly-DADMAC-sepiolite, poly-DADMAC-bentonite and chitosan-sepiolite found to be suitable when applied to water containing bacteria, e.g., *E. coli*, as contaminant, and to water from a natural pond. The nanocomposites AM-co-DMAEA-halloysite, AM-co-DMAEA-bentonite and Zetag 8185-bentonite were found suitable when applied to desalination plant feed water containing suspended negatively-charged colloidal particles.

In certain embodiments, the aqueous environment includes positively-charged colloidal particles suspended therein and the nanocomposite consists of a mineral platform and a polyelectrolyte polymer with negative charges, namely, a polyanionic polymer, to neutralize the positive charge of the colloidal particles. In certain embodiments, the polyanionic polymer is selected from poly(methyl vinyl ether-alt-maleic anhydride) (PMVE) copolymer, poly(acrylamide-co-acrylic acid) (PAM) copolymer, polysulfonates, and natural anionic biopolymers such as carrageenans. In certain embodiments, the nanocomposite is PMVE-bentonite found to be suitable when applied to the water of a natural spring.

In certain embodiments, the aqueous environment includes both negatively- and positively-charged colloidal particles suspended therein and nanocomposite or a mixture of nanocomposites with at least one polycationic polymer and at least one polyanionic polymer is applied to the aqueous environment water.

The method of the invention is in most cases a pretreatment method of water from an aqueous environment before the water enters a water treatment plant for producing potable water. Since the water quality standards are different for the different purposes and for different geographic regions, in certain circumstances, depending on the quality of the original water of the aqueous environment, the method of the invention alone may be sufficient to produce potable water for human consumption or for irrigation. In most circumstances, the treatment by the method of the invention will be followed by the standard treatment of the pre-treated in a municipal or regional water treatment plant.

For illustration, in a water treatment plant, the raw water from an aqueous source such as a surface water lake or reservoir, may be treated by following steps: (i) after removal of large and small debris, the water enters low lift pumps; (ii) the pumps lift the water to flow through the treatment process by gravity; (iv) disinfectants or other oxidants are added to disinfect or control tastes; (v) coagulants are added and the electrochemical charges attract the small particles in water to clump together as a floc, whereby the neutralized flocs agglomerate, but remain suspended; (vi) flocculation occurs in a flocculation basin by slower mixing that causes the flocculated water to form larger floc particles that become cohesive and increase in mass; (vii) in the sedimentation step, the flocculated water is applied to large volume tanks where the dense flocs settle and the settled floc is removed as a waste product to the sewer system: (viii) the relatively floc free, settled water flows through a media filter (e.g., of layers of anthracyte or granular activated carbon and sand); (ix) filtered water in the clear well is treated with disinfectants to inactivate disease-causing organism; (x) secondary disinfection with supplemental chlorine is added to maintain disinfection concentrations while the water is pumped though the distribution system; (xi) treated drinking water is pumped through large pressure pumps to other pumping stations or storage reservoirs; and (xii) water is distributed to the local population.

In another aspect, the present invention provides an improvement whereby in a process for supply of potable water in a water treatment plant, the improvement wherein the coagulation-flocculation steps previous to the chlorination step are carried out in one single step according to the method of claim 1, the flocculated water is applied to large volume tanks where the settled flocs are removed and discharged and the water is filtered, disinfected with disinfectants and then with chlorine, pumped through large pressure pumps to other pumping stations, reservoirs or points of supply within the local distribution system.

In desalination plants, the performance of desalination reverse osmosis (RO) systems relies upon the production of high quality pre-treated water. Removal or reduction of the undesirable materials in the sea water to acceptable levels before desalination will protect the desalination facilities. The type of pre-treatments required depends on the characteristics of the raw water and include coagulation-flocculation steps followed by filtration. In this context, the method of the present invention permits to carry out the coagulation/flocculation in one single step and in a short time.

The invention will now be illustrated by the following non-limiting examples.

EXAMPLES

Example 1. Removal and Inactivation of Microorganisms

Nanocomposites based on sepiolite clay and chitosan (NH) or polyDADMAC (NC) polymers were prepared as described in WO 2012/176190. Since the amount of adsorbed polymers correlates directly to the charge of the nanocomposites (Rytwo et al., 2013), three different polymer to clay ratios were prepared: 0.06, 0.4, and 1 g polymer/g clay. Suspensions based on 5 g clay L-1 were prepared. *E. coli* Tg1 were cultured with 0.5% of each of the nanoparticles for 2 h in room temperature. Suspensions were centrifuged at 100 g (bacteria does not sediment at that RCF). The supernatant was diluted×50,000 and plated in agar plates. The sediment was re-suspended, diluted×50,000 and plated in agar plates.

Table 1 below presents the results of the experiment that can be summarized as follows:

Raw sepiolite clay adsorbs *E. coli*. This can be deduced from the large amount of colonies in the sediment, compared with the amount in the supernatant. However, adsorbed bacteria are still active, and as can be seen they develop colonies Low amounts of polymers are not effective enough, and results obtained with 0.06 g polymer/g sepiolite are similar to those achieved with the clay alone Increasing further the amount of polymer yields complete inactivity of the bacteria, exhibiting very effective antibacterial activity.

TABLE 1

Treatment of water containing *E. coli* bacteria with sepiolite-polyDADMAC (NC) or sepiolite-chitosan (NH) nanocomposite

|  | Polymer | polymer/clay ratio (g/g) | supernatant (colonies) | sediment (colonies) |
|---|---|---|---|---|
| Control | — | — | 148 | 172 |
| sepiolite (0.5%) | — | — | 10 | 194 |
| sepiolite/no bacteria | — | — | 0 | 0 |
| NC10 (0.5%) | polyDADMAC | 0.06 | 1 | 175 |
| NC18 (0.5%) | polyDADMAC | 0.40 | 0 | 0 |
| NC22 (0.5%) | polyDADMAC | 1.00 | 0 | 0 |
| NH10 (0.5%) | Chitosan | 0.06 | 8 | 281 |
| NH18 (0.5%) | Chitosan | 0.40 | 1 | 0 |
| NH22 (0.5%) | Chitosan | 1.00 | 0 | 0 |

Example 2: Removal of Turbidity in Desalination Plant Feed Water

The experiment was performed with raw water from the Eastern Mediterranean Sea sampled at Ashdod desalination plant feed pipe (Israel) and brought to our laboratory. When stirred, the water contained TSS of about 300 mg/L and turbidity of about 200 NTU. Upon settling, the water clarified and after about three hours turbidity decreased by about one order of magnitude, to values of approximately 15 NTU. Electric conductivity was 51 mSi cm$^{-1}$. Evaluated total dissolved solids (TDS) was 36000 mg L$^{-1}$.

Experiments performed trying to determine SDI failed completely: the filter clogged in seconds, and even the initial value was impossible to measure. This indicates that such effluents require pretreatment before being used in desalination membranes. Charge measurements yielded values close to zero, as expected in sea water where the large salts concentration brings the double layer thickness close to zero, and by that the shear potential and the ζ potential are very low.

Thus, we focused on tests aiming to shorten the clarification time. We tested several combinations of clays and polymers, including the "commercial" nanocomposite used in wastewater (NC, based on sepiolite and poly-DADMAC, with a ratio of 1.8 g poly-DADMAC per gram clay), and the nanocomposites used in Example 1 above (NH— sepiolite with chitosan). In this example, we tested several combinations of clays and polymers as detailed in Table 2 below:

TABLE 2

List of raw materials for the preparation of nanocomposites

| Code | Clay | g/L | Polymer | mL or g/L |
|------|------|-----|---------|-----------|
| XZ | Halloysite | 4.00 | ZETAG® 8848 | 0.40 |
| NL | S9 sepiolite | 10.00 | MAGNAFLOC® LT31 | 1.00 |
| Z8185 | | | ZETAG® 8185 | 5.00 |
| SP | KWK bentonite | 6.67 | ZETAG® 8185 | 1.67 |
| NC24 | S9 sepiolite | 10.00 | MAGNAFLOC® LT35 | 18.00 |
| NM | S9 sepiolite | 6.67 | MAGNAFLOC® 110L | 3.33 |
| NZ | S9 sepiolite | 10.00 | ZETAG® 8185 | 10.00 |
| NG | S9 sepiolite | 6.67 | Guar gum | 3.33 |
| NP | S9 sepiolite | 6.67 | ZETAG® 8185 | 1.67 |
| NH | S9 sepiolite | 10.00 | Chitosan | 10.00 |

All nanocomposites were prepared as described in Applicant's previous patent publications WO 2012/176190 and WO 2015/022695.

Materials:

Clays: S9 Sepiolite, a highly efficient powder manufactured from high purity sepiolites (acicular clay) was obtained from TOLSA SA. KWK bentonite, a premium granular food grade sodium bentonite (platelet based clay), is supplied by American Colloid Company as a clarification agent in juices and wines. Its properties are almost identical to those reported for "Wyoming montmorillonite" or "SWy-1/2/3 montmorillonite" which is a smectite mineral originally mined in Cook County, Wyo., considered a "bench mark" bentonite. Sepiolite and bentonite are clay minerals widely used in the industry and allowed for use in most applications including animal feed. Both of them are considered GRAS by EFSA and FDA. Halloysite, a naturally occurring 1:1 aluminosilicate nanotube, relatively rare, is a two-layered aluminosilicate with a predominantly hollow tubular structure in the submicron range and chemically similar to kaolin. The mineral used in this work is prepared by Applied Minerals, Inc. and available from Sigma-Aldrich.

Polymers: ZETAG® 8848FS: Denoted by the manufacturers (CIBA-BASF) as "an inverse emulsion of Copolymer of acrylamide and quaternized cationic monomer". FTIR measurements indicate it is most probably a copolymer of acrylamide and dimethylaminoethyl acrylate (noted as AM-co-DMAEA), also designated Polyquaternium 15, and widely used in wastewater treatment. ZETAG® 8185: similar to ZETAG® 8848FS and denoted by the manufacturers (CIBA-BASF) as "powdered copolymer of acrylamide and quaternized cationic monomer". MAGNAFLOC LT31: Denoted by the manufacturers (CIBA-BASF) as "an aqueous solution of a low molecular weight cationic poly-amine resin", primary coagulant or coagulant aid in the clarification of potable water. All major chemical manufacturers may supply similar formulations. MAGNAFLOC LT35: Denoted by the manufacturers (CIBA-BASF) as "an aqueous solution of cationic polydiallyldimethyl ammonium chloride" used as coagulant or coagulant aid in the clarification of potable water. MAGNAFLOC 110L: Denoted by the manufacturers (CIBA-BASF) as a "high molecular weight anionic polyacrylamide flocculant" supplied as a liquid dispersion grade applied in a wide variety of mineral processing operations. Guar Gum: Cationic guar gum (CAS: 65497-29-2), a modified, naturally derived (from the seeds of the guar plant cyampsis tetragonolobus) quaternary, high-molecular weight soluble polysaccharide, was purchased from Sigma-Aldrich. Chitosan: a biocompatible, antibacterial and environmentally friendly polyelectrolyte with a variety of applications, is produced by the de-acetylation of chitin and, in acidic conditions, forms a cationic polymer; was purchased from Sigma-Aldrich.

We tested commercial NC24 as used in wastewater, based on sepiolite and PD. We didn't test additional nanocomposites based on PD, since NC24 did not deliver efficient results FIG. 1 shows the turbidity measured as a function of settling time, when a suspension of 1% NZ nanocomposites (see Table 2) was added at amounts of 5, 10, 15 or 20 mL/L. It can be seen that doses of 10-20 mL/L (an overall amount of 150-200 mg/L of nanocomposite) yield very fast clarification, and values after 2 min of addition are already less than 20 NTU whereas in the raw effluent are about 100 NTU. In the 20 mL/L dose, less than 15 NTU is measured already after 1 min (whereas the raw effluent at that time is >150 NTU).

Figure 2:
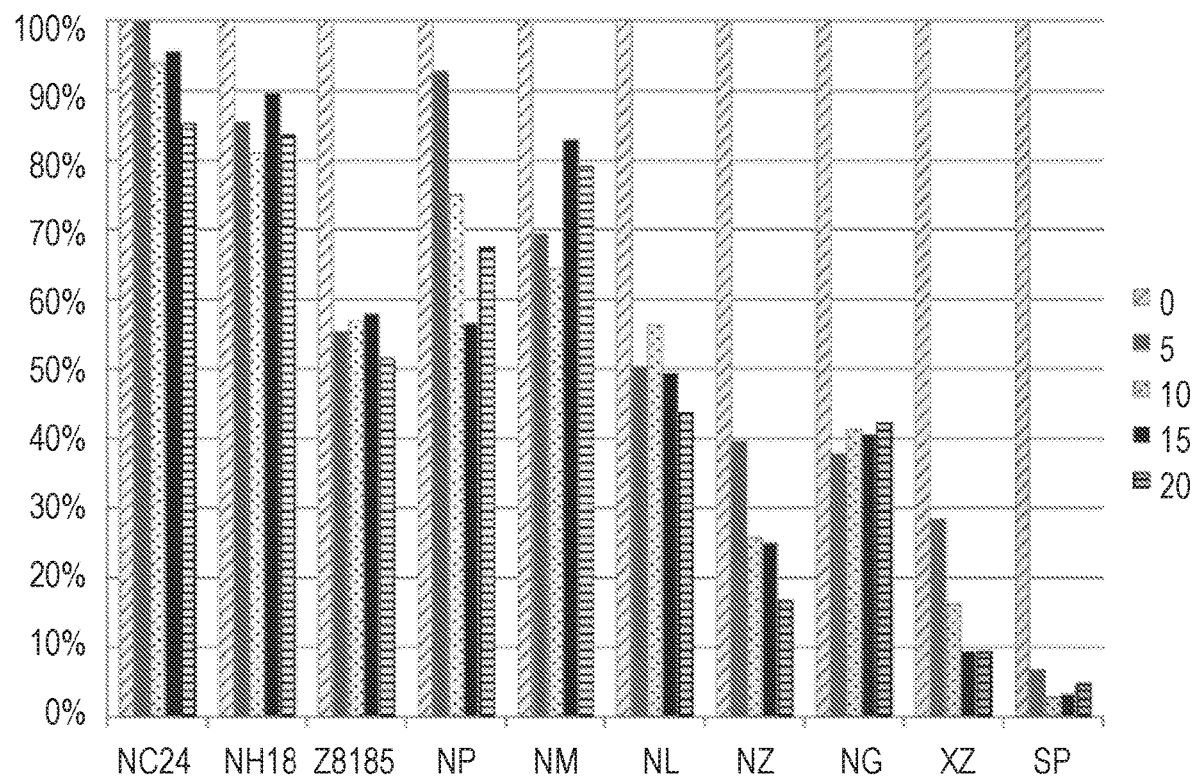
FIG. 2 shows relative turbidity (compared to raw effluents) as a function of several doses (in mL/L), measured 2 min after addition of 1% nanocomposites suspensions as described in Example 2.
Figure 3:
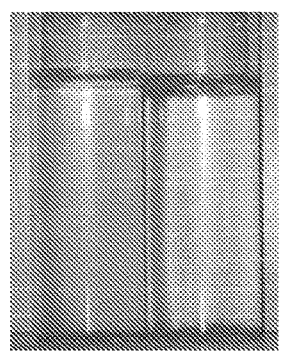
FIG. 3 shows a general view of results obtained with NZ nanocomposites after two minutes. It is possible to note the flocs on the bottom and the top of the right vessel.
Figure 4A:
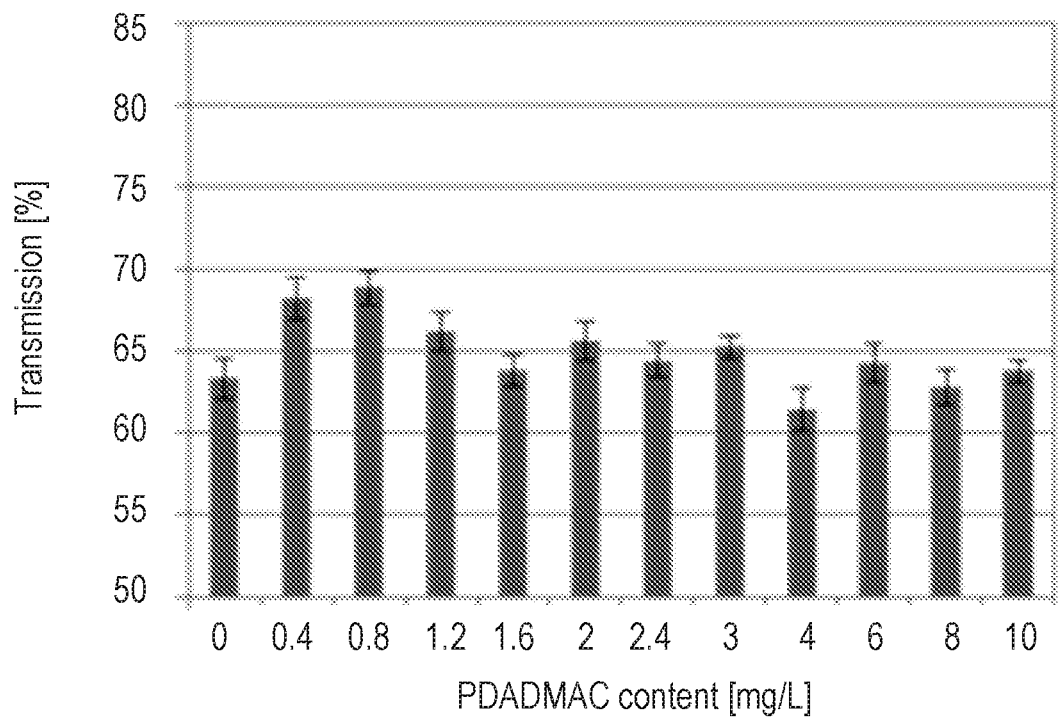
FIGS. 4a-d show light transmission as a function of the amount of clarifier added to the water of a natural pond as described in Example 3.
Figure 4B:
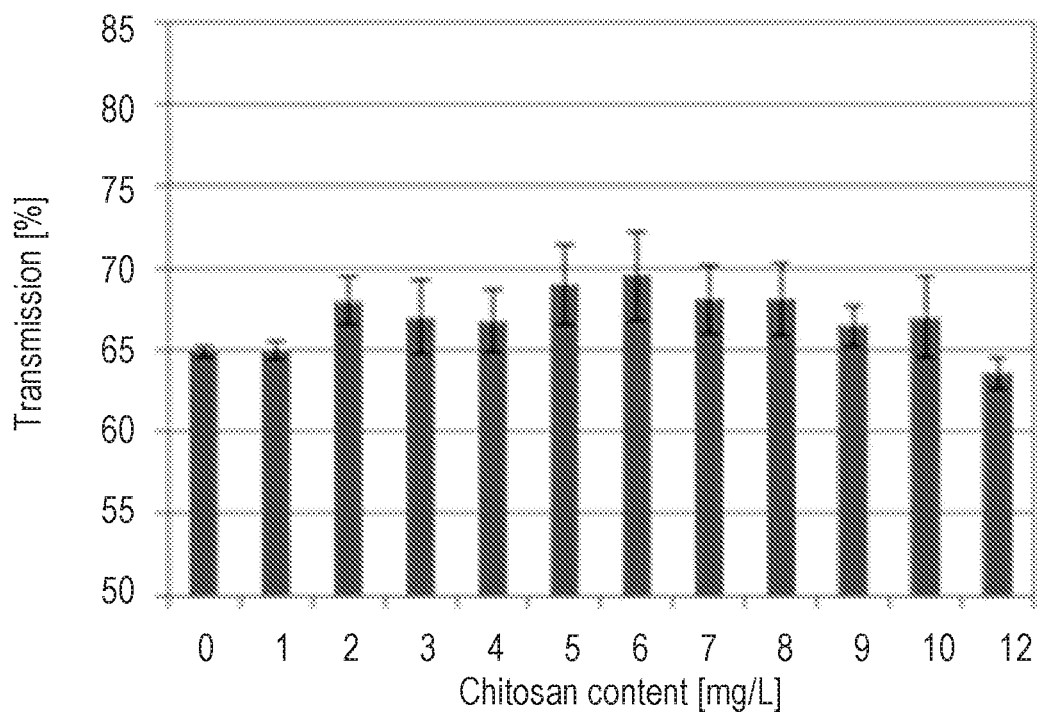
Figure 4C:
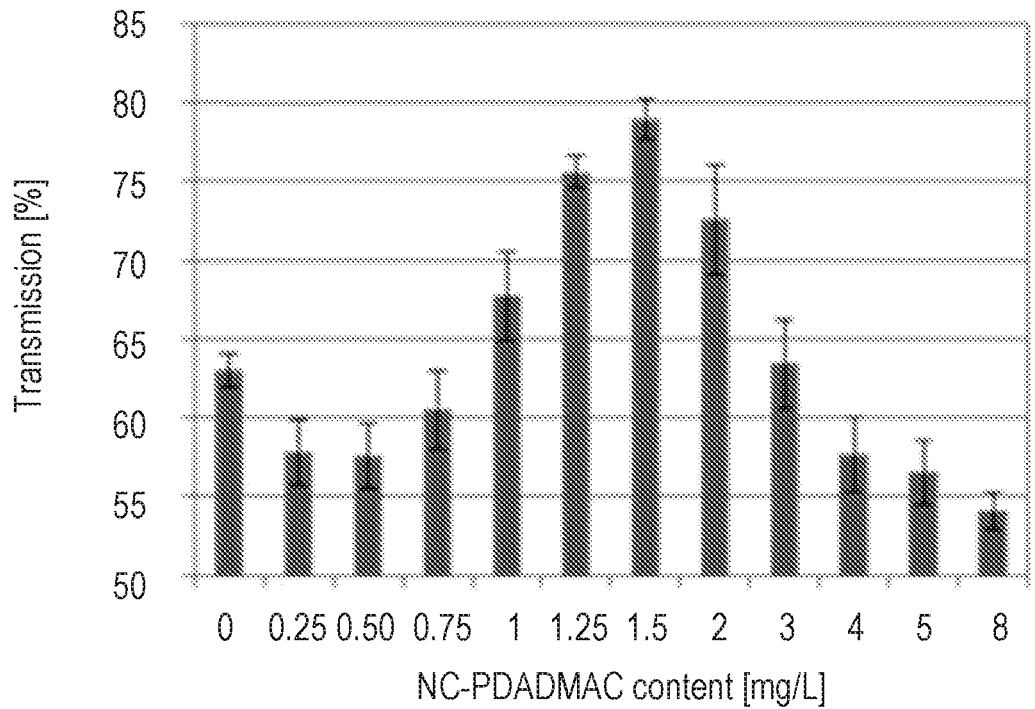
Figure 4D:
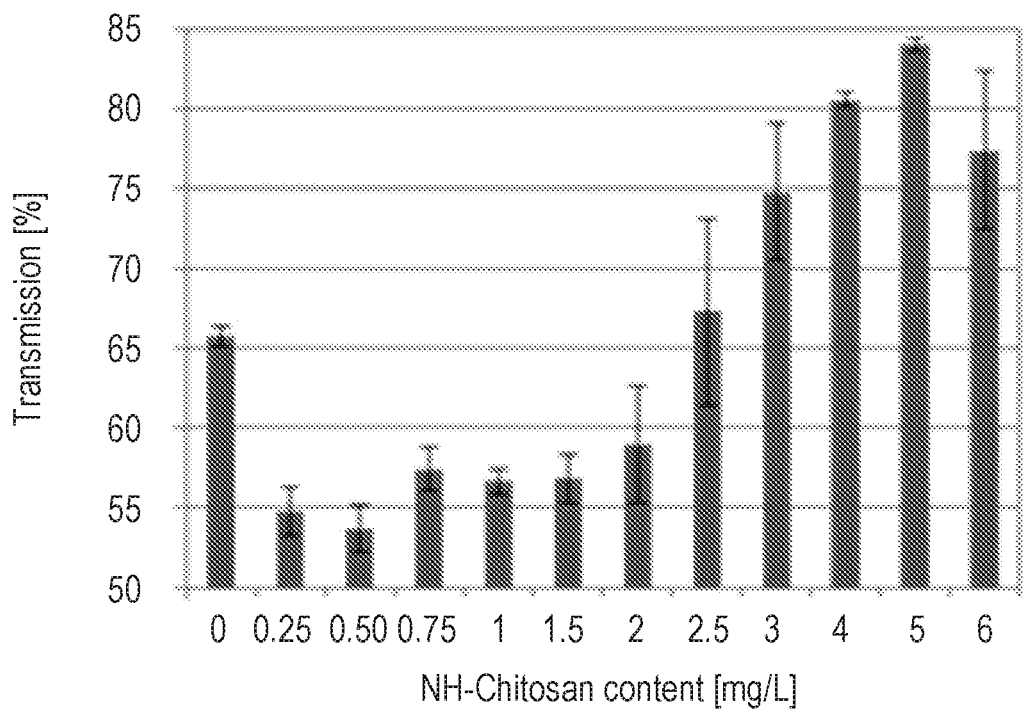

FIG. 2 shows relative turbidity (compared to raw effluents) as a function of several doses (in mL/L), measured 2 min after addition of 1% nanocomposites suspensions. Neither NH nor NC delivered considerable results. Flocculant Z8185 alone lowered about 50% of the turbidity (Z8848 delivered similar results whereas LT31, LT35 and 110L almost did not influence). NG (Guar gum based nanocomposites) lowered turbidity to about 40%. XZ (halloysite with polymer Z8848) yielded interesting results, especially considering the very low polymer amount. The best results were obtained for SP (bentonite with Z8185), even at very low concentrations (slightly less effective results were measured for bentonite with Z8848). Total suspended solids (TSS) was not measured in this experiment, however the widely used approach is that turbidity-TSS relationships show very good linearity passing close to the origin, and regardless the conditions. Based on these studies it is assumed that the ratio of TSS reduction will be similar to the measured turbidity removal.

In summary, it can be seen that several nanocomposite formulations might be very effective for the fast clarification of desalination feed water. The best formulations were based on formulation of a low charge cationic branched polymer (AM-co-DMAEA) whereas smectitic clay (commercial bentonite) exhibited the best results in turbidity reduction. However it should be emphasizes that even sepiolite with the bio-polymer guar-gum achieved a very fast 60% turbidity removal at very low doses. Increasing the dose in this case didn't improve the result.

Example 3: Clarification of Water from a Natural Pond

Experiment was performed with water from a small natural pond located near the village of Yiron, Israel (33°04'35.4"N, 35°27'21.4"E). Water in the pond is relatively very turbid (turbidity=190 NTU), presumably due to accumulation of organic matter and nutrients caused by grazing animals in the immediate surrounding of the pond. Some inhabitants mentioned that in the past there were intentions to pump the water and use it for irrigation, but the high TSS levels (~400 mg $L^{-1}$) clogged the filters in the irrigation system. Electric conductivity of the water in the pond was 0.78 mSi $cm^{-1}$, yielding an evaluated TDS=420 mg $L^{-1}$.

Preliminary charge measurements performed using a particle charge detector as reported in previous study yielded a negative charge of −45 μmolc $L^{-1}$. Such values are considerably smaller than those measured for industrial effluents (Rytwo et al., 2014). The negative charge of the colloids indicates the need for cationic coagulants or flocculants to achieve neutralization and clarification. Thus, nanocomposites based on poly-DADMAC and chitosan were tested, and compared to the raw polymers.

The clarification efficiency of doses of nanocomposites or commercial compounds on the pond water was tested by the influence on the light transmission as measured by means of a LUMiSizer (6110) dispersion analyzer. The instrument records the NIR (near infrared) light transmission during centrifugation over the total length of a cell containing the nanosuspension. It automatically determines the time dependence position of the interface panicle-free fluid/suspension or sediment by a special algorithm. The transmission profile enables characterizing the smallest deviations in size of dispersed particles and quantifying the degree of polydispersity at high-volume concentrations. The average light transmission during the first 60 s was chosen as a useful parameter to compare between treatments. Increased light transmission indicates efficient clarification. Profiles were taken every 5 at a relative centrifugal force of 4.98 g (200 rpm).

FIGS. 4A-D show light transmission as a function of the amount of clarifier added. The experiment focused on comparing a cationic commercial flocculant (polyDADMAC), a cationic biopolymer used for water treatment (chitosan), and nanocomposites prepared by binding those polymers to sepiolite. It can be seen that the raw pond water exhibits a light transmission of 60-65%. It can be seen from FIGS. 4A and 4B that changing the dose of the raw cationic polymers doesn't change considerably light transmission, reaching for all doses values of <70%. Addition of nanocomposites (FIGS. 4C,4D) essentially decreases the transmission due to the turbidity of the clay-polymer particles. However, at suitable doses transmission increases to 80%, and even reaches 85% for chitosan-sepiolite nanocomposites.

Table 3 concentrates turbidity measurements performed 10 minutes after the addition of the optimal doses as determined by the dispersion analyzer experiment. Table 3 also summarizes and evaluated TSS values. It can be seen that nanocomposites based on 0.2 g chitosan per g sepiolite, added from a 5% suspension (based on the clay concentration) at a dose of 50 ml/L remove almost completely turbidity. Nanocomposites based on 0.08 g polyDADMAC per g sepiolite at the same dose achieve also good results. Equivalent amounts of polymers achieve considerably lower clarification.

tion. However, when trying to reduce organic content (measured generally as Total Organic Carbon-TOC), acetic acid might be detrimental, and increase TOC. Thus, preparation of NH with HCl 0.1 mM instead of acetic acid 1N was tested. Performance of NH nanocomposites prepared with this procedure yielded very similar results than the previous form of preparation. Thus, the use of HCl is preferred since it will not increase TOC values.

In summary, this example shows that fresh water from a natural pond can be clarified by the suitable dose of nanocomposites addition, achieve an almost complete removal of turbidity and, accordingly, a similar removal in the TSS.

Example 4: Clarification of Water from a Natural Spring

Experiment was performed with water from a small spring at "Ein Avazim" nature reserve, located in the western shoulder of Hulah Valley to the south of Kiryat Shmona village, Israel (33°09'42.8"N, 35°34'11.3"E). Water at the sampling spot had a turbidity=130 NTU, however the value decreases rapidly if water are left to settle, and reaches ~100 NTU after 60 min, and remains almost constant afterwards. Electric conductivity of the water in the pond was 0.62 mSi $cm^{-1}$, yielding an evaluated TDS=340 mg $L^{-1}$.

Preliminary charge measurements performed using a particle charge detector as reported in previous study yielded an unusual positive value of +20 µmolc $L^{-1}$. The positive charge of the colloids indicates that the usual cationic coagulants or flocculants might not be efficient in this case, and anionic polymers or/and nanocomposites might be needed.

Figure 5:
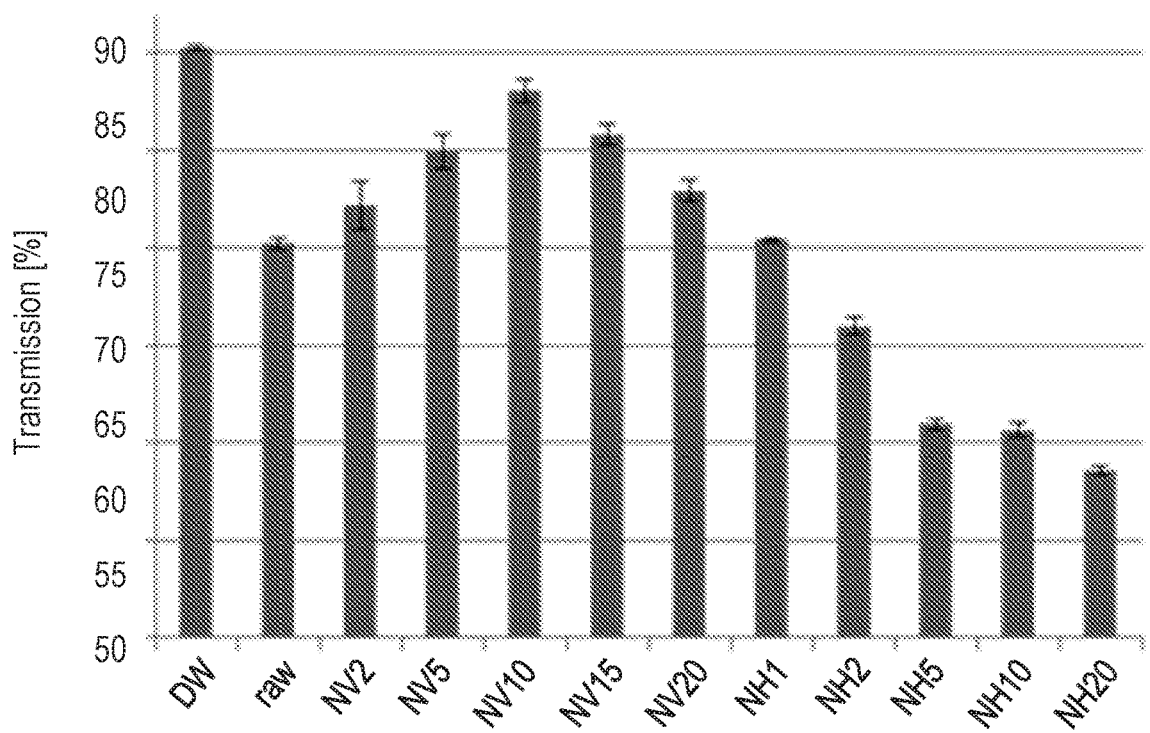
FIG. 5 shows light transmission as a function of the amount of the type and amount of nanocomposite suspension added to the water of a natural spring as described in Example 4 herein.

Several nanocomposites were applied to the water of this natural spring. FIG. 5 shows light transmission as a function of the amount of the type and amount of nanocomposite suspension added. NV represents a suspension of 5% S9 sepiolite with poly(methyl vinyl ether-alt-maleic anhydride) (PMVE) copolymer (CAS 9011-16-9) bound to it at a ratio of 0.2 g polymer per g clay. Such nanocomposites are negatively charged. NH represents a suspension of 5% S9 sepiolite with chitosan bound to it at a ratio of 0.20 g polymer per g clay. Such nanocomposites that performed very efficient clarification in Example 3 are positively charged. The numbers aside indicate the dose in mL suspension $L^{-1}$ treated water. DW shows the light transmission of distilled water, indicating as the matter of fact the

TABLE 3

Summary of turbidity removal and evaluated TSS in selected treatments

| | Sample | Polymer/ clay ratio g/g | Suspension volume ml/L | Total polymer mg/L | Turbidity NTU | Turbidity removal % | Evaluated TSS mg/L |
|---|---|---|---|---|---|---|---|
| Nano-composites | Raw | | | | 177.0 | | 312.0 |
| | sepiolite-chitosan 5% | 0.2 | 50 | 5 | 4.3 | 97.60% | 3.4 |
| | Sepiolite-PD 5% | 0.08 | 50 | 1.5 | 18.1 | 89.80% | 14.5 |
| Raw polymers | Chitosan solution 2% | | 25 | 5 | 37.1 | 79.00% | 29.6 |
| | PD solution 2% | | 7.5 | 1.5 | 58.1 | 67.20% | 46.3 |

The most efficient nanocomposites in this case were those based on sepiolite and chitosan. It should be mentioned that in order to achieve efficient cationic charges on the chitosan usually 1N acetic acid is used in the procedure of preparamaximum possible transmission—90%. Raw effluents exhibit a transmission of about 80%. NH cationic nanocomposite treatments do not clarify the water. Light transmission even decrease due to light dispersion caused by the suspended added nanocomposites. The anionic nanocomposites exhibit a very efficient clarification, and at a dose of about 10 mL L$^{-1}$ light transmission approaches the value of DW (89%). PMVE solution (pure polymer, not bound to clay) clarification efficiency was tested in a range of 0-20 mg L$^{-1}$, and no clarification was observed at any added dose (results not shown).

Figure 6:
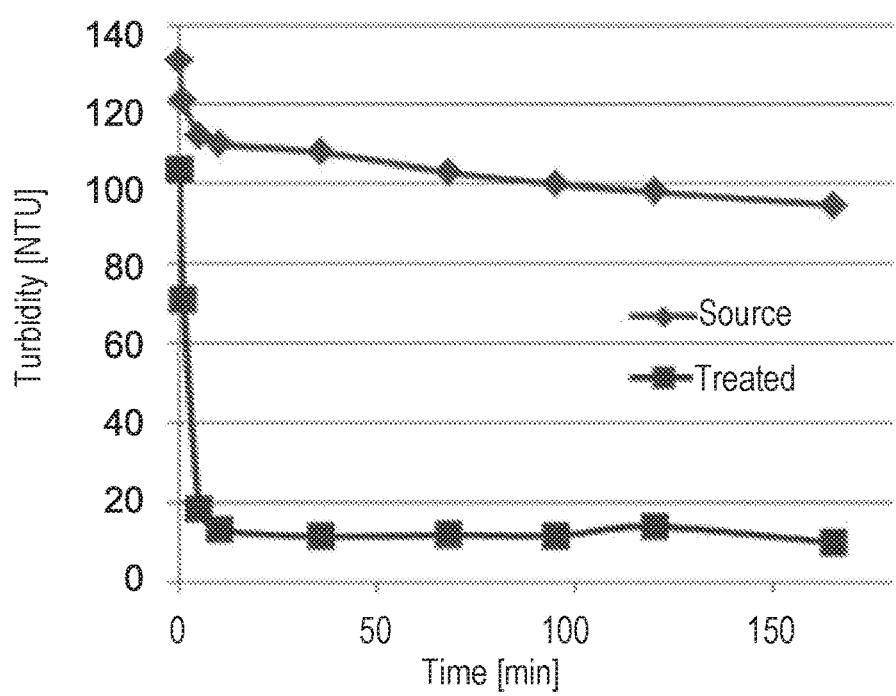
FIG. 6 shows the turbidity of a spring water compared with water treated with a 5% NV nanocomposite suspension based on 0.2 g PMVE per g of sepiolite, at a dose of 10 ml L-1, as described in Example 4 herein.

FIG. 6 shows the turbidity of the spring water compared with water treated with a 5% NV nanocomposite suspension based on 0.2 g PMVE per g of sepiolite, at a dose of 10 ml L$^{-1}$. It can be seen that after 10 min a 90% turbidity removal is achieved.

REFERENCES

Adin, A., Klein-Banay, C., 1986. Pretreatment of seawater by flocculation and settling for particulates removal. Desalination 58, 227-242

Hannouche, A., Chebbo, G., Ruban, G., Tassin, B., Lemaire, B. J., Joannis, C., 2011. Relationship between turbidity and total suspended solids concentration within a combined sewer system. Water Sci. Technol. 64, 2445-52

Litaor, M. I., Meir-Dinar, N., Castro, B., Azaizeh, H., Rytwo, G., Levi, N., Levi, M., MarChaim, U., 2015. Treatment of winery wastewater with aerated cells mobile system. Environ. Nanotechnology, Monit. Manag.

Rytwo, G., 2012. The Use of Clay-Polymer Nanocomposites in Wastewater Pretreatment. Sci. World J., vol. 2012, Artcle ID 498503, 7 pages Rytwo, G., Lavi, R., Konig, T. N., Avidan, L., 2014. Direct Relationship Between Electrokinetic Surface-charge Measurement of Effluents and Coagulant Type and Dose. Colloids Interface Sci. Commun. 1, 27-30.

Rytwo, G., Lavi, R., Rytwo, Y., Monchase, H., Dultz, S., Konig, T. N., 2013. Clarification of olive mill and winery wastewater by means of clay-polymer nanocomposites. Sci. Total Environ. 442, 134-142.

Rytwo, G., Malka, H., 2013. A pilot plant for the treatment of cowshed effluents. Water Irrig. 530, 6-9.

Walton, N. R. G., 1989. Electrical Conductivity and Total Dissolved Solids—What is Their Precise Relationship? Desalination 72, 275-292. doi:10.1016/0011-9164(89)80012-8

The invention claimed is:

1. A single-step method for production of potable water from water of an aqueous environment contaminated with a microorganism, the method comprising:
   applying to the water of said aqueous environment an effective amount of at least one nanocomposite consisting of: a clay mineral, and at least one polyelectrolyte polymer adsorbed to said clay mineral
   wherein the effective amount is sufficient for substantially reducing colony formation of said microorganism, so as to obtain said potable water;
   wherein the clay mineral comprises kaolinite and is characterized by a particle size of less than 0.5 µm;
   wherein said polyelectrolyte polymer comprises poly-DADMAC; and
   wherein said aqueous environment is selected from a river, a lake, a reservoir, a pond, a stream, groundwater, spring water, surface water, or combinations thereof and wherein a weight ratio between the polyelectrolyte polymer and the clay mineral is 0.06:1-1.8:1 g/g.

2. The method according to claim 1, wherein the microorganism is selected from the group consisting of virus, bacteria, fungi, yeast, mold, parasite, algae, prion, and a combination thereof.

3. The method according to claim 1, wherein said microorganism comprises *E. coli*.

* * * * *